United States Patent
Guo

(10) Patent No.: US 12,483,135 B2
(45) Date of Patent: Nov. 25, 2025

(54) METHODS AND APPARATUS TO IMPROVE TRANSIENT RESPONSE PERFORMANCE OF BUCK REGULATORS

(71) Applicant: Texas Instruments Incorporated, Dallas, TX (US)

(72) Inventor: Song Guo, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 141 days.

(21) Appl. No.: 18/204,278

(22) Filed: May 31, 2023

(65) Prior Publication Data

US 2024/0405676 A1 Dec. 5, 2024

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05); *H02M 1/0025* (2021.05)

(58) Field of Classification Search
CPC ... H02M 3/158; H02M 1/0009; H02M 1/0025
See application file for complete search history.

(56) References Cited

U.S. PATENT DOCUMENTS

2017/0077812 A1* 3/2017 Guo .................. H02M 3/158

OTHER PUBLICATIONS

Guo, "Accuracy-Enhanced Ramp-Generation Design for D-CAP3 Modulation," Texas Instruments white paper, SLVA762A, Jan. 2016, Revised Apr. 2016, 9 pages.

* cited by examiner

*Primary Examiner* — Rafael O De Leon Domenech
(74) *Attorney, Agent, or Firm* — Frank D. Cimino

(57) ABSTRACT

An example apparatus includes: a first switch having a first terminal coupled to a switch terminal and a second terminal coupled to a current sense positive (CSP) terminal; a second switch coupled to the CSP terminal and to a first resistor; the first resistor coupled to the second switch and to ground; a first capacitor having a positive terminal coupled to the CSP terminal and a negative terminal coupled to ground; a second resistor coupled to the CSP terminal and to a current sense negative (CSN) terminal; a second capacitor coupled to the CSN terminal and coupled to ground; a third switch coupled to the CSP terminal and a third resistor; the third resistor having coupled to the third switch and a voltage source; and the voltage source coupled to the third resistor and to ground.

20 Claims, 9 Drawing Sheets

METHODS AND APPARATUS TO IMPROVE TRANSIENT RESPONSE PERFORMANCE OF BUCK REGULATORS

TECHNICAL FIELD

This description relates generally to buck regulators and, more particularly, to methods and apparatus to improve transient response performance of buck regulators.

BACKGROUND

Power management circuitry is a critical design component of any electronic device. In general, power management circuitry refers to hardware and/or software that converts a first amount of power (e.g., a first voltage and/or current) received from a source into a second amount of power (e.g., a second voltage and/or current) that is consumable by a load. Power sources may include, but are not limited to, 120 volts alternating current (VAC) or 240 VAC wall outlets, batteries, generators, power provided by solar cells, etc. Generally, power management circuitry may additionally convert the power from a first type (e.g., alternating current (AC)) to a second type (e.g., direct current (DC)) that is usable by the load.

SUMMARY

For methods and apparatus to improve transient response performance of buck regulators, an example apparatus includes a first switch having a first terminal coupled to a switch terminal and a second terminal coupled to a current sense positive (CSP) terminal; a second switch coupled to the CSP terminal and to a first resistor; the first resistor coupled to the second switch and to ground; a first capacitor having a positive terminal coupled to the CSP terminal and a negative terminal coupled to ground; a second resistor coupled to the CSP terminal and to a current sense negative (CSN) terminal; a second capacitor coupled to the CSN terminal and coupled to ground; a third switch coupled to the CSP terminal and a third resistor; the third resistor having coupled to the third switch and a voltage source; and the voltage source coupled to the third resistor and to ground.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
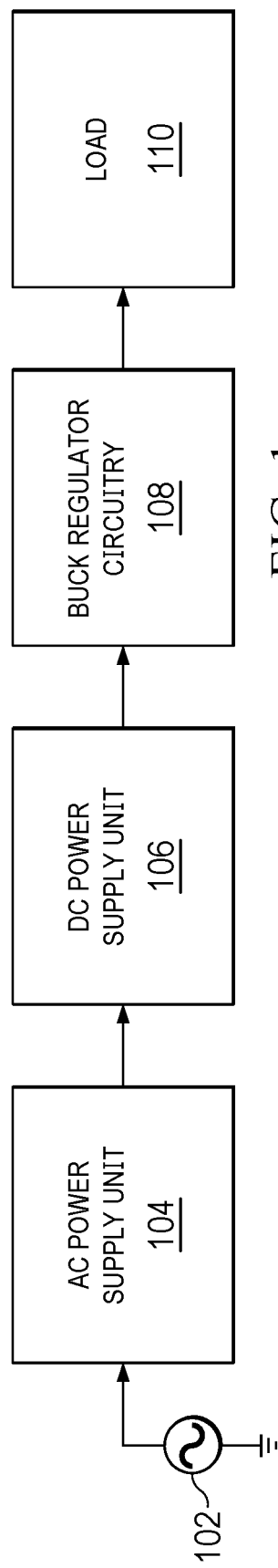
FIG. 1 is an example of power delivery that includes buck regulator circuitry.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Power management circuitry can refer to a wide variety of circuit architectures that implement different functionalities. One such example of power management circuitry are voltage regulators. Voltage regulators refer to a category of circuit architectures designed to provide a constant voltage to a load. One example implementation of a voltage regulator is a buck regulator circuit that is designed to accept a first DC voltage from a supply and output a lower, second DC voltage to a load. Buck regulator circuits can also provide increased current at the second DC voltage compared to the current that can be provided at the first DC voltage. In some examples, buck regulators are referred to as buck regulators.

Buck regulator circuits generally include, at a minimum, an inductor and a set of switches rated for high current and high voltage applications (e.g., a power metal-oxide-semiconductor field-effect transistor (MOSFET)). In some examples, an inductor and the corresponding power MOSFETs are referred to as either a power stage circuit or a phase circuit. The phase circuit may provide the lower, second DC voltage to the load based in response to receiving an activation signal (e.g., a pulse) from a controller circuit.

Some previous solutions to implement buck regulator circuits include additional hardware components to increase the accuracy of the voltage output by the phase circuit. The additional hardware components may include a high gain loop that compares a feedback voltage corresponding to the output of the phase circuit with a reference voltage. In such examples, the controller circuit adjusts one or more properties of the pulse transmissions (length of a pulse, time interval between pulses, etc.) based on the high gain loop comparison, thereby maintaining an accurate output voltage at the phase circuit. As used above and herein, the output voltage at the phase circuit may be described as $V_{out}$.

While implemented to increase accuracy, the use of a high gain loop in a buck regulator circuit can also decrease performance in some use cases. Implementation of the high gain loop used in some previous solutions includes resistors that divide $V_{out}$ and produce a reference voltage, $V_{REF}$, for comparison. The ratio of the reference voltage to the output voltage. $V_{REF}/V_{out}$, is proportional to gain crossover frequency (GCF). GCF refers to the frequency at which the gain of the buck regulator circuit switches between positive and negative (i.e., the frequency at which the gain is 0 decibels (dB)). GCF is proportional to the transient response of the phase circuit, meaning that after a pulse is transmitted, a phase circuit with a relatively high GCF will settle on a desired voltage faster than a phase circuit with a relatively low GCF.

In use cases where $V_{out}$ is relatively high, $V_{REF}/V_{out}$ is relatively low. In such use cases, the GCF of previous solutions with high gain loops is relatively low and the transient response of the phase circuits is relatively slow. This increased time for phase circuits to stably change an output voltage may result in errors at the load and is considered to be a lower quality performance than phase circuits with fast response times.

Example methods, apparatus, and systems described herein implement a highly accurate buck regulator architecture in which GCF is independent of $V_{in}$ and $V_{out}$. As used above and herein, the input voltage received by buck regulator circuitry may be referred to as $V_{in}$. Example buck regulator circuitry includes example ramp emulator circuitry that uses a ramp signal to emulate voltages exhibited by the phase circuit. The buck regulator circuitry also includes example controller circuitry, which generates the ramp signal such that a current sense positive terminal is charged to a fixed amplitude for the duration of a switch cycle. The example ramp emulator circuitry also includes components that support both continuous conduction mode and a discontinuous conduction mode. The design of the example ramp emulator circuitry and ramp signal implement in a buck regulator in which the values of $V_{in}$ and $V_{out}$ do not affect GCF, resulting in the production of a $V_{out}$ that changes values both accurately and more quickly than previous solutions.

FIG. 1 is an example of power delivery that includes buck regulator circuitry. FIG. 1 includes a power source 102, an AC power supply unit 104, a DC power supply unit 106, buck regulator circuitry 108, and a load 110.

The example power source 102 provides AC power. The power source 102 may be implemented by any device providing electrical energy in AC. For example, in FIG. 1, the example power source 102 is implemented by a 120 VAC outlet.

The example AC power supply unit 104 transforms the 120 VAC into a different AC signal that is operable upon by the DC power supply unit. In particular, the AC power supply unit 104 may alter one or more of the voltage, frequency, shape of signal, number of phases, etc., depending on the type of the power source 102 and the requirements of the DC power supply unit.

The example DC power supply unit 106 transforms the AC signal received from the AC powers supply unit 104 into a DC signal. The DC power supply unit 106 includes rectifier circuitry and filter circuitry to convert the AC signal to a DC signal. The DC power supply unit 106 is configured to provide a DC signal at a voltage that is operable by the example buck regulator circuitry 108. In some examples, the DC power supply unit 106 is referred to as a voltage source.

The example buck regulator circuitry 108 is a voltage regulator circuit that transforms, in accordance with the teachings of this disclosure, the first DC voltage provided by the example DC power supply unit 106 into a second DC voltage usable by the load 110. The buck regulator circuitry 108 is discussed further in connection with FIG. 2.

In FIG. 1, the example load 110 is processor circuitry that uses the power from the second DC voltage to perform operations. In other examples, the load that receives the second DC voltage is another form of circuitry, including but not limited to a transceiver, volatile memory, etc. The exemplary processor circuitry of load 110 may be implemented by any type of processor circuitry such as programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs).

Figure 2:
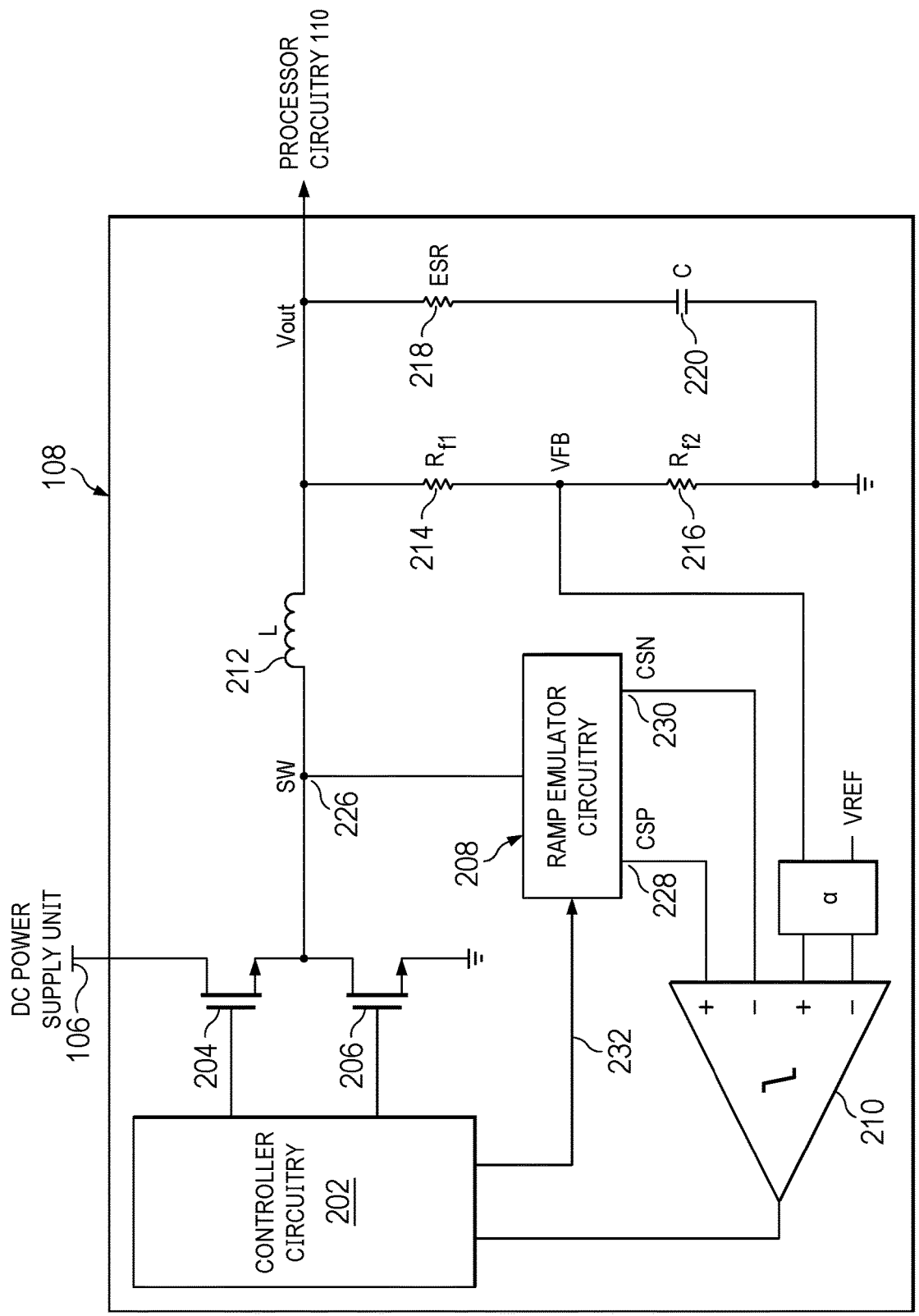
FIG. 2 is an example schematic diagram of the buck regulator circuitry of FIG. 1.

FIG. 2 is an example schematic diagram of the buck regulator circuitry 108 of FIG. 1. The example buck regulator circuitry 108 includes the controller circuitry 202, a high side field-effect transistor (HS FET) 204, a low side field-effect transistor (LS FET) 206, ramp emulator circuitry 208, comparator circuitry 210, an inductor 212, resistors 214, 216, 218, and a capacitor 220. The example buck regulator circuitry 108 also includes a switch (SW) terminal 226, a current sense positive (CSP) terminal 228, a current sense negative (CSN) terminal 230, and control signals 232A, 232B, 232C, 232D, 232E (collectively referred to as control signals 232).

The example controller circuitry 202 coordinates the operations of other components within the buck regulator circuitry 108 to convert $V_{in}$, which is received from the DC power supply unit 106, to $V_{out}$, which is operable by the load 110. For example, the controller circuitry 202 provides voltages to the gates of both the HS FET 204 and the LS FET 206. Both the HS FET 204 and the LS FET 206 are coupled to the inductor 212, which in turn is coupled to the example load 110 via the $V_{out}$ terminal. When the voltage provided to the HS FET 204 crosses a threshold, the HS FET 204 turns on, causing current to flow from the DC power supply unit 106 and through the inductor 212. Alternatively, when the voltage provided to the LS FET 206 crosses a threshold, the current from the DC power supply unit 106 flows to ground, causing the current flowing through the inductor 212 to decrease. The controller circuitry 202 provides the voltages such that only one of HS FET 204 and LS FET 206 are on at any point in time. As a result, the voltage of the SW terminal 226, which connects the inductor 212 to the source of the HS FET 204 and the drain of the LS FET 206, alternates in a pulse pattern. In some examples the SW terminal 226 is referred to as a node of the buck regulator circuitry 108.

The example controller circuitry 202 also coordinates operations by providing the control signals 232 to the ramp emulator circuitry 208 in accordance with the teachings of this disclosure. For example, the control signals 232 cause switches within the ramp emulator circuitry 208 to transition between open (non-conductive) and closed (non-conductive) states. It is noted that a control signal to open a switch does not change the state of a switch that is already open; the switch merely stays open. Similarly, a control signal to close a switch does not change the state of a switch that is already closed; the switch merely stays closed. The control signals 232 also adjust resistance and capacitance values within the ramp emulator circuitry 208. The controller circuitry 202 is discussed further in connection with FIGS. 6-8.

The example ramp emulator circuitry 208 implements a resistor capacitor (RC) filter in accordance with the teachings of this disclosure. The ramp emulator circuitry 208 produces voltages on the CSP terminal 228 and CSN terminal 230 that are indicative of the current flowing through the inductor 212. To produce the appropriate voltages, the ramp emulator circuitry 208 transitions between switch states, changes resistor values, and changes capacitor values based on the voltage of the SW terminal 226 and the control signals 232. The ramp emulator circuitry 208 is discussed further in connection with FIG. 3.

The example comparator circuitry 210 compares voltages from the CSP terminal 228 and CSN terminal 230 to a feedback voltage ($V_{FB}$) and a reference voltage ($V_{REF}$), both of which are amplified by a constant α. The resistors 214, 216 produce $V_{FB}$ by connecting to the $V_{out}$ terminal and forming a voltage divider. Accordingly, the comparator receives a voltage of $$V_{out}(\alpha)\left(\frac{R_{216}}{R_{216} + R_{214}}\right),$$

and the voltage of the $V_{out}$ terminal is scaled properly for comparison with the reference voltage. The example comparator circuitry 210 provides the output of the comparisons to the controller circuitry 202, which uses the output to adjust one or more properties of the pulse transmissions (pulse width, time interval between pulses, etc.) provided to the HS FET 204 and LS FET 206.

The example capacitor 220 charges the $V_{out}$ terminal when the LS FET 206 is on and the current through the inductor 212 has decreased. The example resistor 218 represents the internal resistance of the capacitor 220. In some examples, the value of the resistor 218 is described as the equivalent series resistance (ESR). In some previous solutions, the capacitor 220 could only be implemented by high ESR capacitors (e.g., capacitors with a large resistor 218) because the resistor 218 is responsible for creating a ripple voltage used to offset noise at the output of the voltage. In the example buck regulator circuitry 202, however, the ripple voltage is produced by the controller circuitry 202 and the example resistor 218 may be any value.

In the example of FIG. 2, the example HS FET 204, the example LS FET 206, the inductor 212, resistor 218, and capacitor 220 are an example implementation of a phase circuit that is managed by the controller circuitry 202. The buck regulator circuitry 108 also includes the ramp emulator circuitry 208, the comparator circuitry 210, and the resistors 214, 216 to form a feedback loop that increases the accuracy of the voltage conversion between $V_{in}$ and $V_{out}$. Advantageously, the control signals 232 and the ramp emulator circuitry 208 are implemented in accordance with the teachings of the disclosure such that the GCF of the buck regulator circuitry 108 is independent of $V_{in}$ and $V_{out}$. Accordingly, the example buck regulator circuitry 108 can provide accurate voltage conversions with fast transient response in a wide variety of use cases, including applications with a high value of $V_{in}$.

In some examples, the buck regulator circuitry includes means for controlling a phase circuit. For example, the means for controlling may be implemented by controller circuitry 202. In some examples, the controller circuitry 202 may be instantiated by programmable circuitry such as the example programmable circuitry 912 of FIG. 9. For instance, the controller circuitry 202 may be instantiated by a microprocessor executing machine executable instructions such as those implemented by at least FIGS. 6-8. Additionally or alternatively, the controller circuitry 202 may be instantiated by any other combination of hardware, software, and/or firmware. For example, the controller circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
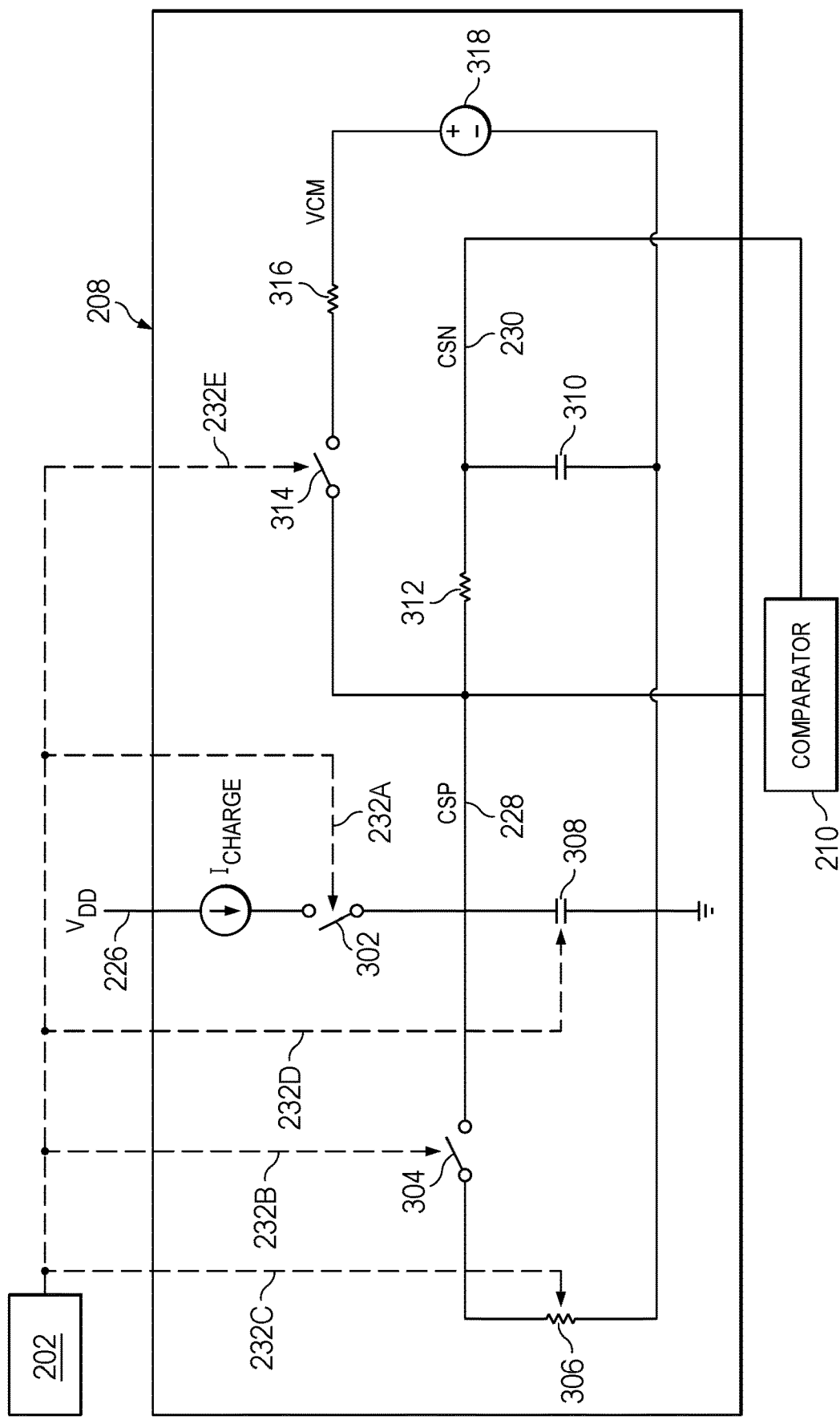
FIG. 3 is an example schematic diagram of the ramp emulator circuitry of FIG. 2.

FIG. 3 is an example schematic diagram of the ramp emulator circuitry 208 of FIG. 2. The ramp emulator circuitry 208 includes the CSP terminal 228, the CSN terminal 230, switches 302, 304, a resistor 306, capacitors 308, 310, a resistor 312, a switch 314, a resistor 316, and a voltage source 318.

In the example of FIG. 3, switches 302, 304, 314, are implemented as single-pole single-throw switches within the ramp emulator circuitry 208 for simplicity. In other examples, the ramp emulator circuitry may alternatively be implemented with other types of switches logically equivalent to the schematic diagram of FIG. 3.

The example switch 302 includes a first terminal coupled to the SW terminal 226 and a second terminal coupled to the CSP terminal 228. The switch 304 includes a first terminal coupled to the CSP terminal 228 and a second terminal coupled to the resistor 306. The resistor 306 includes a first terminal coupled to the switch 304 and a second terminal coupled to ground. The capacitor 308 has a positive terminal coupled to the CSP terminal 228 and a negative terminal coupled to ground. The capacitor 310 includes a positive terminal coupled to the CSN terminal 230 and a negative terminal coupled to ground. The resistor 312 includes a first terminal coupled to the CSP terminal 228 and a second terminal coupled to the CSN terminal 230. Together, the resistor 312 and capacitor 310 form an RC filter that prevents a range of frequencies from reaching the comparator circuitry 210. In some examples, one or both of the CSP terminal 228 and the CSN terminal 230 are referred to as nodes of the ramp emulator circuitry 208.

The example controller circuitry 202 provides control signals 232A, 232B to switches 302, 304, respectively. The control signals 232A, 232B cause the switches 302, 304 to transition between states such that one of the switches is closed and the other switch is open at any point during continuous conduction mode (CCM). CCM refers to a mode of operation in which the buck regulator circuitry 108 is powered on and continuously providing pulses to the phase circuit described above in connection to FIG. 2. In some examples, the width of a pulse refers to the amount of time between consecutive instances of the HS FET 204 transitioning from off to on. The width of a pulse may also be referred to as a duty cycle, or as a switching time (abbreviated herein as $T_{SW}$). $T_{SW}$ is discussed further in connection with FIG. 4.

At the beginning of the duty cycle, the example controller circuitry 202 provides control signals 232A, 232B such that switch 302 is closed and switch 304 is open. During this time, the capacitor 308 is connected to a DC supply voltage (such as the voltage provided by the DC power supply unit 106) thereby charging the capacitor 308 and increasing the voltage of the CSP terminal 228. The controller circuitry 202 causes the switch 302 to be closed and the switch 304 to be open until the voltage of the CSP terminal 228 rises to a fixed amplitude, hereby referred to as A. After the CSP terminal 228 reaches A volts, the controller circuitry 202 provides control signals 232A, 232B such that switch 302 opens and switch 304 closes. In turn, the capacitor 308 is discharged through the resistor 306 and to ground, causing the CSP terminal 228 to discharge linearly throughout the rest of the duty cycle.

The example ramp emulator circuitry 208 supports both CCM and discontinuous conduction mode (DCM). DCM refers to a mode of operation in which the current demand of the load 110 is lower than the current ripple of the inductor 212, allowing both the HS FET 204 and LS FET 206 to be off for a period. In some examples, the buck regulator circuitry 108 includes multiple phase circuits. In such examples, one of the phase circuits may be in DCM (and therefore not providing power to the load 110) while other phase circuits are in CCM (and therefore are providing power to the load 110). The example controller circuitry 202 places the phase circuit of FIG. 2 in DCM by: a) turning the HS FET 204 off, b) turning the LS FET 206 off, and c) providing control signals 232A, 232B such that switches 302, 304 are both open at the same time. The controller circuitry 202 may place the phase circuit for any amount of time.

In some previous solutions, the placement of ramp emulator circuitry into DCM for extended periods may cause internal capacitors to inadvertently discharge and produce leakage current. This leakage current would change the voltages used for comparison in the feedback loop and negatively impact the transient response of the previous solution buck regulator.

Advantageously, the example ramp emulator circuitry 208 includes the switch 314, which has a first terminal coupled to the CSP terminal 228 and a second terminal coupled to the resistor 316. The resistor 316 has a first terminal coupled to the switch 314 and a second terminal coupled to the positive terminal of the voltage source 318. The voltage source 318 includes a positive terminal coupled to the resistor 316 and a second terminal coupled to ground. When in CCM, the controller circuitry 202 provides control signal 232 to keep the switch 314 in an open state. When in DCM, the controller circuitry 202 provides control signal 232E to close the switch 314, thereby allowing current to flow from the voltage source 318 and into the capacitors 308, 310. Any leakage current discharged from the capacitors 308, 310 is therefore refilled by the voltage source 318, allowing the CSP terminal 228 and the CSN terminal 230 to stay at constant voltages even when in DCM for extended periods.

Another metric that can be used to characterize the performance of a buck regulator circuit is phase margin. Phase margin refers to the amount of change needed in a GCF measurement to make a closed loop system unstable. The closed loop of a circuit with a comparatively high phase margin will remain stable for a greater amount of GCF change than the closed loop of a circuit with a comparatively low phase margin. Accordingly, a comparatively high phase margin is considered a higher quality performance than a comparatively low phase margin.

Phase margin is proportional to the average voltage of the CSP terminal 228 and the CSN terminal 230 while in CCM. This average voltage may be referred to as voltage common mode ($V_{CM}$) and is defined in equation (1):

$$V_{CM} = (A \times R_{306} \times C_{308})/T_{SW} \qquad (1)$$

In equation (1), A refers to the amplitude voltage reached by the CSP terminal 228 at the start of a duty cycle, $R_{306}$ refers to the impedance of resistor 306 in ohms, $C_{308}$ refers to the capacitance of the capacitor 308 in Farads, and $T_{SW}$ refers to the amount of time in a duty cycle as described above. In operation, the values of A and $T_{SW}$ are configurable and may be changed at any time. The controller circuitry 202 may change the values based on instructions from an external source (e.g., a processor), which may determine values of A and/or $T_{SW}$ based on a particular use case. Advantageously, the resistor 306 is implemented as a variable resistor and the capacitor 308 is implemented as a variable capacitor. The controller circuitry 202 adjusts the resistance of the resistor 306 and the capacitance of the capacitor 308 by providing the control signals 232C, 232D, respectively. Accordingly, the controller circuitry 202 adjusts the resistance and capacitance such that $V_{CM}$ stays constant. In turn, $V_{CM}$ is prevented from inadvertently decreasing and the phase margin of the buck regulator circuit remains comparatively high, regardless of which values of A and $T_{SW}$ are chosen.

Figure 4:
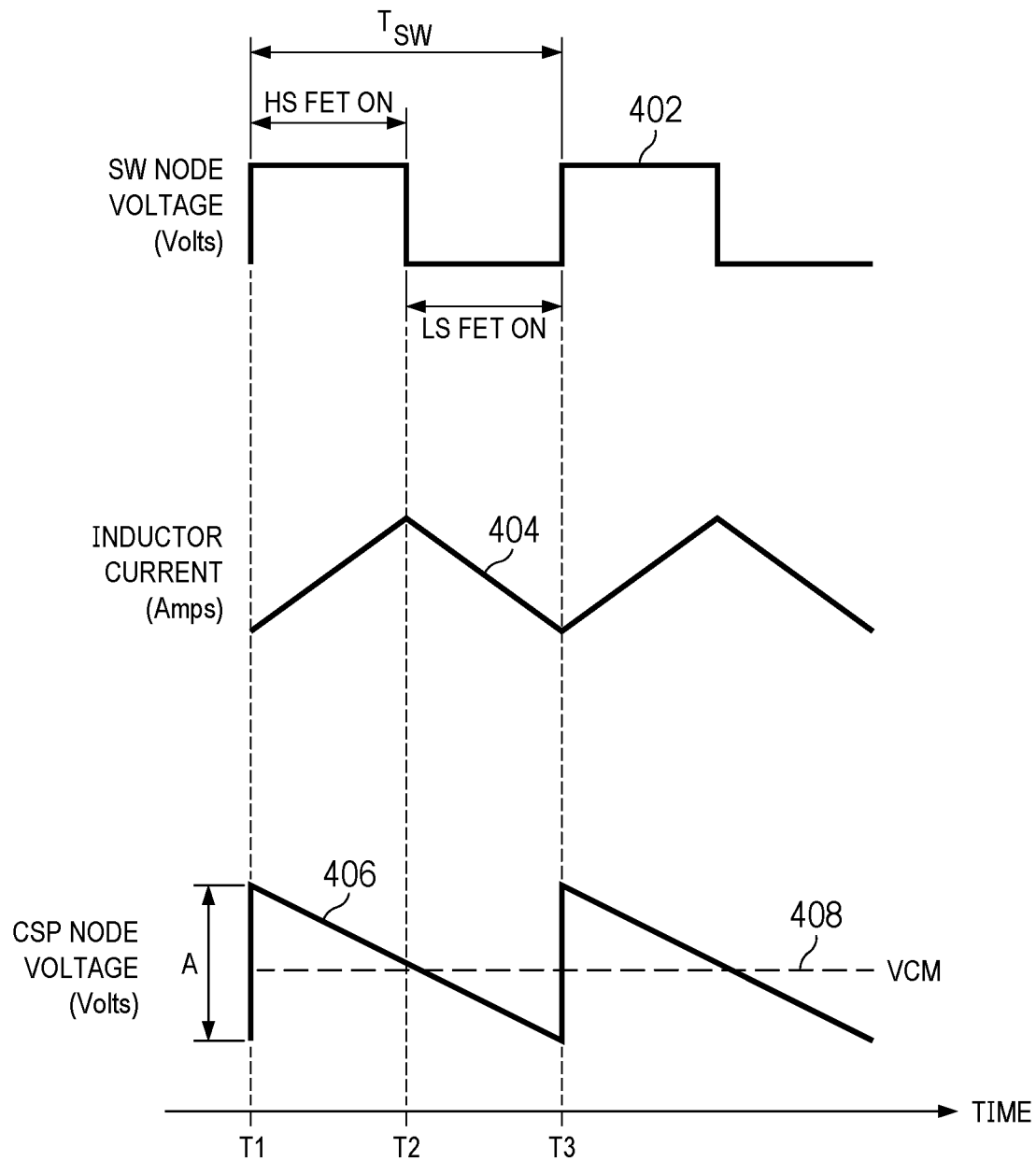
FIG. 4 is an example timeline of signals received or produced by the ramp emulator circuitry of FIG. 2.

FIG. 4 is an example timeline of signals received or produced by the ramp emulator circuitry of FIG. 2. FIG. 4 shows a timeline that includes example signals 402, 404, 406, 408. The timeline also includes timestamps T1, T2, T3.

The signal 402 represents the voltage of the SW terminal 226 over time. From T1 to T2, the controller circuitry 202 causes HS FET 204 to be on and LS FET 206 to be off. From T2 to T3, the controller circuitry 202 causes HS FET 204 to be off and LS FET 206 to be on. Accordingly, the time between T1 and T3 is equal to one pulse, one duty cycle, and $T_{SW}$. FIG. 4 is an example implementation of CCM because, at T3, the controller circuitry 202 causes HS FET 204 to be on and LS FET 206 to be off.

The signal 404 represents the current flowing through the inductor 212 over time. When HS FET 204 is on and LS FET 206 is off (e.g., between T1 and T2, immediately after T3, etc.), the signal 404 shows the current through the inductor 212 increases. Alternatively, when HS FET 204 is off and LS FET 206 is on (e.g., between T2 and T3, etc.), the signal 404 shows the current flowing through the inductor 212 decreases. The slope of the signal 404 is given by equation (2):

$$\text{Inductor Current Slope} = V_{out}/L_{212} \qquad (2)$$

In equation (2), $V_{out}$ is the output voltage provided to the load 110 and $L_{212}$ is the inductance of the inductor 212.

The signal 406 represents the voltage of the CSP terminal 228 over time. In some examples, the signal 406 is referred to as a ramp signal. The controller circuitry 202 causes the HS FET 204 to turn on, switch 302 to close, and switch 304 to open at the same time or in substantially real time. While FIG. 4 shows the voltage of the CSP terminal 228 increases to A volts instantaneously, in practice, the amount of time required to charge the CSP terminal 228 to A volts depends on the size of the capacitors 308 and the rate of current flow through the SW terminal 226. In response to the signal 406 reaching A volts, the controller circuitry 202 causes switch 302 to open and switch 304 to close, thereby decreasing the voltage throughout the rest of the duty cycle (e.g., until T3). The structure of the example ramp emulator circuitry 208 and the operations of the example controller circuitry 202 cause the voltage of the CSP terminal 228 to change as shown in signal 406. As a result, the GCF of the buck regulator circuitry 108 can remain high and support a fast transient response in a variety of use cases, including those with a high value of $V_{in}$ or $V_{out}$. The relationship between GCF, $V_{in}$, and $V_{out}$ is discussed further in connection with FIG. 5.

In FIG. 4, the signal 406 shows the value of A is kept constant. In use cases where the value of A changes, the example controller circuitry 202 adjusts the resistor 306 and/or capacitor 308 to keep $V_{CM}$, represented as signal 408, constant. Accordingly, the phase margin of the buck regulator circuitry 108 is independent of the selected value of A.

Figure 5:
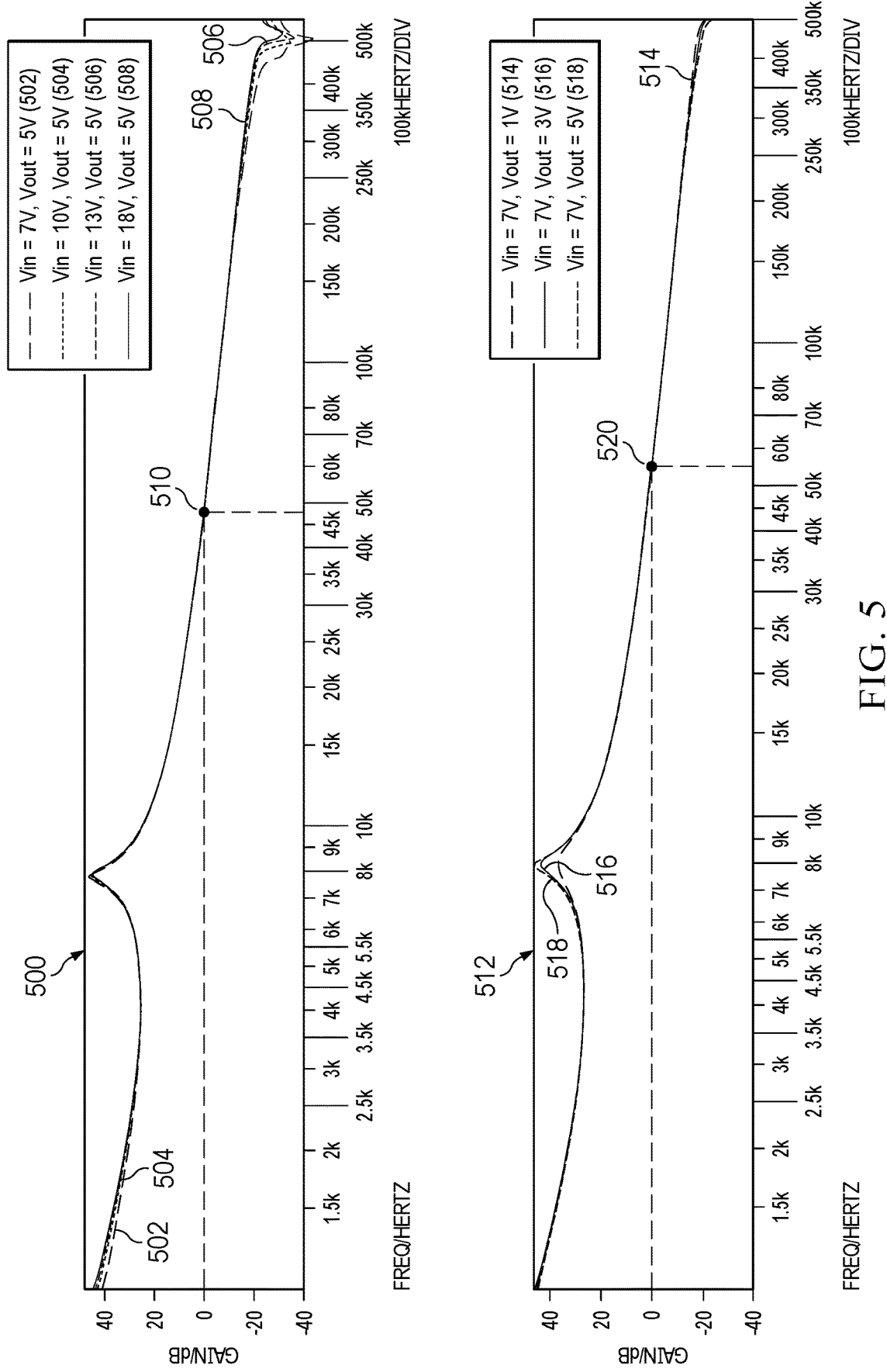
FIG. 5 are example graphs illustrating the gain crossover frequency of the buck regulator circuitry of FIG. 1.

FIG. 5 are example graphs illustrating the gain crossover frequency of the buck regulator circuitry of FIG. 1. FIG. 5 includes a graph 500, which includes example signals 502, 504, 506, 508, and the data point 510. FIG. 5 also includes a graph 512, which includes example signals 514, 516, 518, and the data point 520.

The x axis of FIG. 5 represents the frequency, in Hertz, of pulses sent to the inductor 212 while in CCM. The x axis of FIG. 5 may be determined by $1/T_{SW}$. The y axis of FIG. 5 represents the closed loop gain, in decibels (dB), of the buck regulator circuitry 108.

In the graph 500, each of the signals 502, 504, 506, and 508 represent use cases where the buck regulator circuitry 108 provides the same $V_{out}$ value to the load 110. However, buck regulator circuitry 108 receives $V_{in}$=7 V at signal 502, $V_{in}$=10 V at signal 504, $V_{in}$=13 V at signal 506, and $V_{in}$=18 V at signal 508. Despite the different use cases, the data point 510 of gain=0 dB, frequency ≈47 kHz lies on each of the signals 502, 504, 506, and 508. That is, each of the use cases given by signals 502, 504, 506, and 508 share a common GCF shown in FIG. 5 as the data point 510. Accordingly, the buck regulator circuitry 108 supports a GCF that is independent of variations to $V_{in}$.

In the graph 512, each of the signals 514, 516, 518 represent use cases where the buck regulator circuitry 108 provides the same $V_{in}$ value to a load. However, buck regulator circuitry 108 produces $V_{out}$=1 V at signal 514, $V_{out}$=3 V at signal 516, and $V_{out}$=5 V at signal 518. Despite the different use cases, the data point 520 of gain=0 dB, frequency ≈55 kHz lies on each of the signals 514, 516, 518. That is, each of the use cases given by signals 514, 516, 518 share a common GCF shown in FIG. 5 as the data point 520. Accordingly, the buck regulator circuitry 108 supports a GCF that is independent of variations to $V_{out}$.

While an example manner of implementing the controller circuitry of FIG. 1 is illustrated in FIG. 2, one or more of the elements, processes, and/or devices illustrated in FIG. 2 may be combined, divided, re-arranged, omitted, eliminated, and/or implemented in any other way. Further, the example controller circuitry 202 of FIG. 2, may be implemented by hardware alone or by hardware in combination with software and/or firmware. Thus, the example controller circuitry 202 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)). ASIC(s), programmable logic device(s) (PLD(s)), and/or field programmable logic device(s) (FPLD(s)) such as FPGAs. Further still, the example controller circuitry 202 of FIG. 2 may include one or more elements, processes, and/or devices in addition to, or instead of, those illustrated in FIG. 2, and/or may include more than one of any or all of the illustrated elements, processes and devices.

Figure 6:
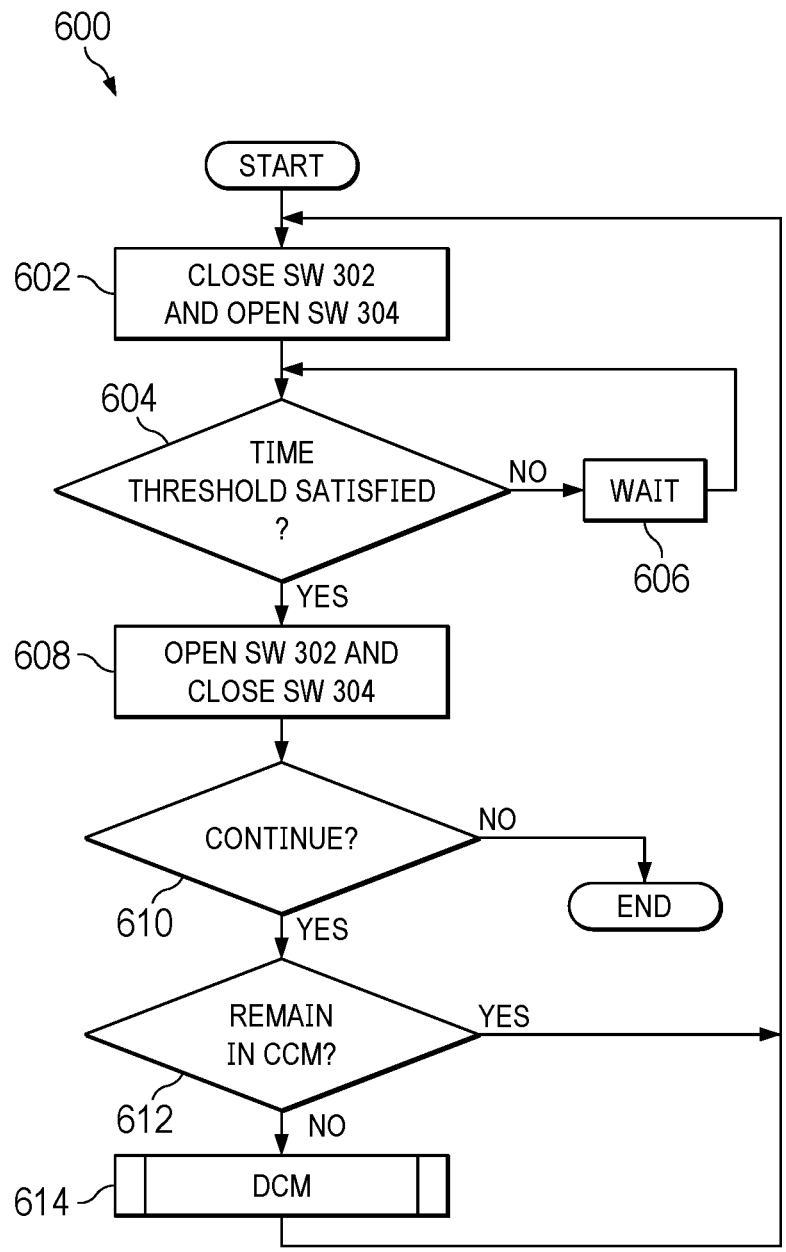
FIG. 6 is a flowchart representative of example machine readable instructions and/or example operations that may be executed, instantiated, and/or performed using an example programmable circuitry implementation of the controller circuitry of FIG. 2 to enter discontinuous conduction mode (DCM).
Figure 7:
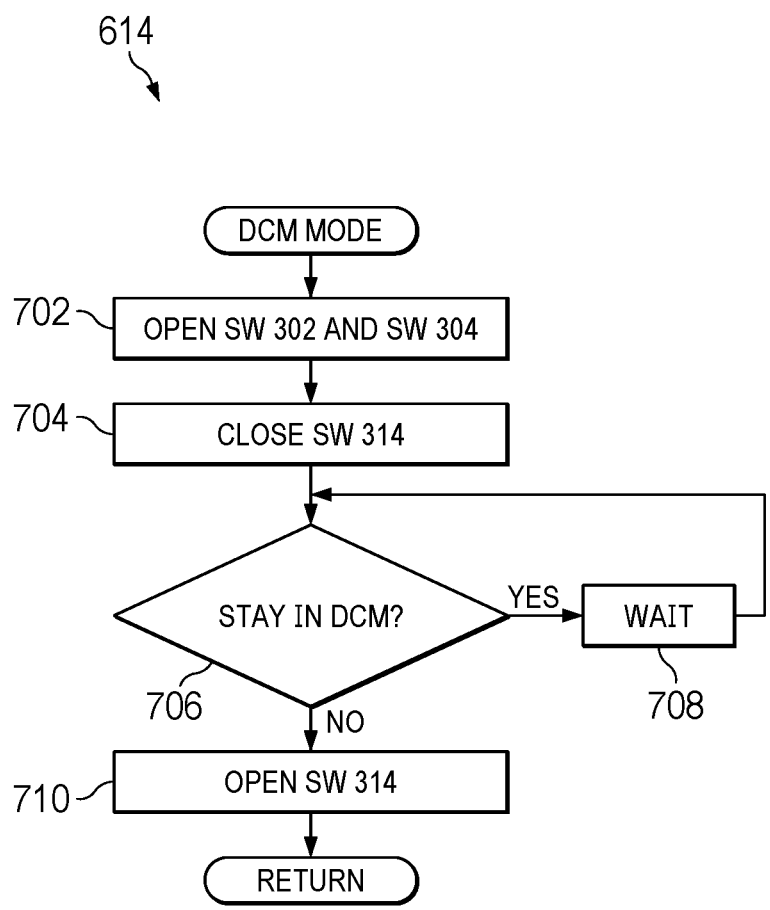
FIG. 7 is a flowchart representative of example machine readable instructions and/or example operations that may be executed, instantiated, and/or performed using an example programmable circuitry implementation of the controller circuitry of FIG. 2 to implement DCM as described in connection with FIG. 6.
Figure 8:
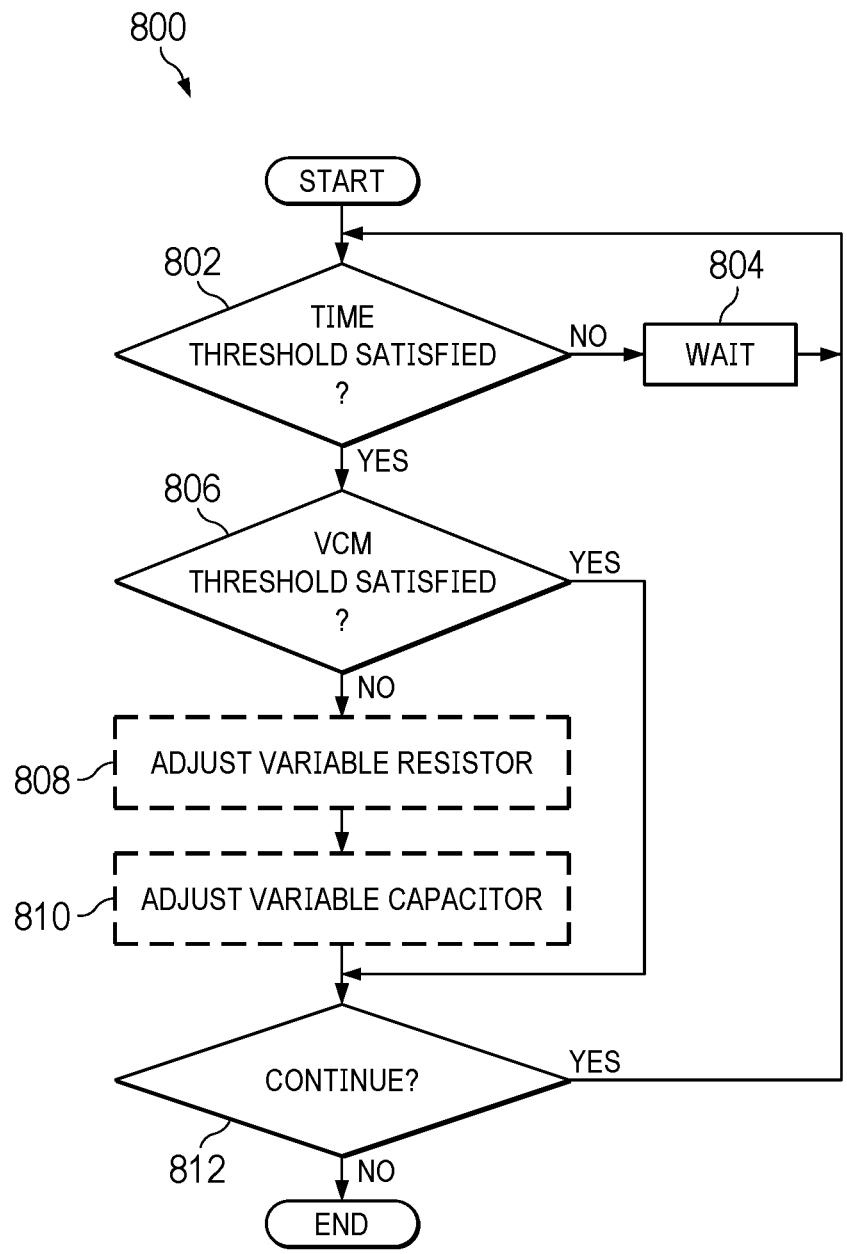
FIG. 8 is a flowchart representative of example machine readable instructions and/or example operations that may be executed, instantiated, and/or performed using an example programmable circuitry implementation of the controller circuitry of FIG. 2 to adjust electrical properties of the ramp emulator circuitry of FIG. 2.

Flowchart(s) representative of example machine readable instructions, which may be executed by programmable circuitry to implement and/or instantiate the controller circuitry of FIG. 2 and/or representative of example operations which may be performed by programmable circuitry to implement and/or instantiate the controller circuitry 202 of FIG. 2, are shown in FIGS. 6-8. The machine readable instructions may be one or more executable programs or portion(s) of one or more executable programs for execution by programmable circuitry such as the programmable circuitry 912 shown in the example programmable circuitry platform 900 described below in connection with FIG. 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6-8, many other methods of implementing the example controller circuitry may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or another machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 6 is a flowchart representative of example machine readable instructions and/or example operations 600 that may be executed, instantiated, and/or performed by programmable circuitry to implement the controller circuitry 202 to coordinate the voltage of the CSP terminal 228 and the CSN terminal 230. The example machine-readable instructions and/or the example operations 600 begin at the start of a duty cycle when the controller circuitry 202 provides the control signals 232A, 232B to close switch 302 and open switch 304. (Block 602). The example controller circuitry 202 also turns the HS FET 204 on and the LS FET 206 off at block 602. Accordingly, the current through the inductor 212 increases and the CSP terminal 228 charges to A volts as described above.

The controller circuitry 202 determines whether a time threshold has been satisfied. (Block 604). The threshold of block 604 is satisfied when one half of a duty cycle, ($T_{SW}/2$), has passed since the execution of block 604. If the time threshold is not satisfied (Block 604: No), the controller circuitry 202 waits an amount of time (Block 606) before control returns to block 604.

If the time threshold has satisfied a threshold (Block 606: Yes), the controller circuitry 202 provides control signals 232A, 232B to open switch 302 and close switch 304. (Block 608). The example controller circuitry 202 also turns the HS FET 204 off and the LS FET 206 on at block 608. Accordingly, the current through the inductor 212 decreases and the CSP terminal 228 discharges linearly as described above.

The example controller circuitry 202 determines whether to continue providing pulses in either CCM or DCM. (Block 610). The example controller circuitry 202 may continue providing pulses in either CCM or DCM when the buck regulator circuitry 108 is powered on. If the example controller circuitry 202 determines not to continue providing pulses in either CCM or DCM (Block 610: No), the machine readable instructions and/or operations 600 end.

If the example controller circuitry 202 determines to continue providing pulses in either CCM or DCM (Block 610: Yes), the controller circuitry 202 determines whether to remain in CCM. (Block 612). The controller circuitry 202 may remain in CCM if the computational operations of the load 110 present a continuous need for power.

If the controller circuitry 202 stays in CCM (Block 612: Yes), then control returns to block 602 where the controller circuitry 202 provides control signals 232A, 232B to close switch 302 and open switch 304. Alternatively, if the controller circuitry 202 stays in CCM (Block 612: No), the controller circuitry 202 enters DCM. (Block 614). The controller circuitry 202 may enter the DCM mode in response to a decrease in power requirements from the load 110 (e.g., a processor has entered a sleep state). Block 614 is discussed further in connection with FIG. 7. In FIG. 4, control returns to block 602 after block 614, and the controller circuitry 202 operates in CCM for at least one duty cycle before the operations 600 end. In other examples, the operations 600 end immediately after execution of block 614.

FIG. 7 is a flowchart representative of example machine readable instructions and/or example operations that may be executed, instantiated, and/or performed using an example programmable circuitry implementation of the controller circuitry of FIG. 2 to implement DCM as described in connection with FIG. 6. In particular, the flowchart of FIG. 7 is an example implementation of block 614 of FIG. 6.

Execution of block 614 begins when the controller circuitry 202 provides control signals 232A, 232B to open both switch 302 and switch 304. (Block 702). Opening both switch 302 and switch 304 prevents any intentional changes to the voltages of the CSP terminal 228 and the CSN terminal 230.

The controller circuitry 202 provides control signal 232E to close switch 314. (Block 704). After switch 314 is closed the flow of current from the voltage source 318 counteracts any current leakage from the capacitors 308, 310, thereby preventing inadvertent changes to the voltages of the CSP terminal 228 and the CSN terminal 230. The controller circuitry 202 may execute block 702 and 704 in any order and in substantially real time.

The controller circuitry 202 determines whether to stay in DCM. (Block 706). In some examples, the controller circuitry 202 stays in DCM until the power requirements from the load 110 exceed a threshold. If the controller circuitry 202 stays in DCM (Block 706: Yes), the controller circuitry 202 waits an amount of time (Block 708) before control returns to block 706.

Alternatively, if the controller circuitry 202 determines not to stay in DCM (Block 706: No), the controller circuitry 202 provides control signal 232E to open switch 314. (Block 710). Opening switch 314 stops current flow from the voltage source 318 affecting the CSP terminal 228 and the CSN terminal 230, which is desired when the controller circuitry 202 is in t CCM. Control returns to block 602 after execution of block 710.

FIG. 8 is a flowchart representative of example machine readable instructions and/or example operations that may be executed, instantiated, and/or performed using an example programmable circuitry implementation of the controller circuitry of FIG. 2 to adjust electrical properties of the ramp emulator circuitry of FIG. 2. The example machine-readable instructions and/or the example operations 800 begin when the controller circuitry 202 determines whether a time threshold has been satisfied. (Block 802). In some examples, the time threshold of block 802 is satisfied when at least a pre-determined amount of time has passed since the previous occurrence of the threshold being satisfied. In the first iteration of FIG. 8, the time threshold of block 802 is satisfied when at least a pre-determined amount of time has passed since the buck regulator circuitry 108 was powered on.

If the time threshold is not satisfied (Block 802: No), the controller circuitry 202 waits an amount of time (Block 804) before control returns to block 802. Alternatively, if the time threshold is satisfied (Block 802: Yes), the controller circuitry 202 determines whether a $V_{CM}$ threshold is satisfied. (Block 806). The $V_{CM}$ threshold of block 806 is satisfied when the $V_{CM}$ of the ramp emulator circuitry 208, as defined in equation (1) above, is within a pre-determined voltage range.

If the $V_{CM}$ threshold is not satisfied (Block 806: No), the controller circuitry 202 provides the control signal 232C to adjust the resistance of resistor 306 (Block 808). The controller circuitry 202 additionally and/or alternatively and provides the control signal 232D to adjust the capacitance of capacitor 308 (Block 810). Thus, the controller circuitry 202 executes one or both of blocks 808 and 810 if the $V_{CM}$ threshold is not satisfied (Block 806: No). When implementing block 808 and/or block 810, the controller circuitry 202 adjusts $R_{306}$ and/or $C_{308}$ of equation (1) such that the $V_{CM}$ threshold is satisfied. Accordingly, the controller circuitry 202 keeps $V_{CM}$ in the pre-determined voltage range despite any number of changes that may be made to A and/or $T_{SW}$ of equation (1).

After execution of block 808 and/or block 810, or if $V_{CM}$ threshold is satisfied (Block 806: Yes), the controller circuitry 202 determines whether to continue. (Block 812). In some examples, the controller circuitry 202 continues implementing the flowchart of FIG. 8 for as long as the buck regulator circuitry 108 is powered on. If the determination of block 812 is to continue (Block 812: Yes), control returns to block 802. Alternatively, if the controller circuitry 202 determines not to continue (Block 812: No), the machine readable instructions and/or operations 800 end.

Figure 9:
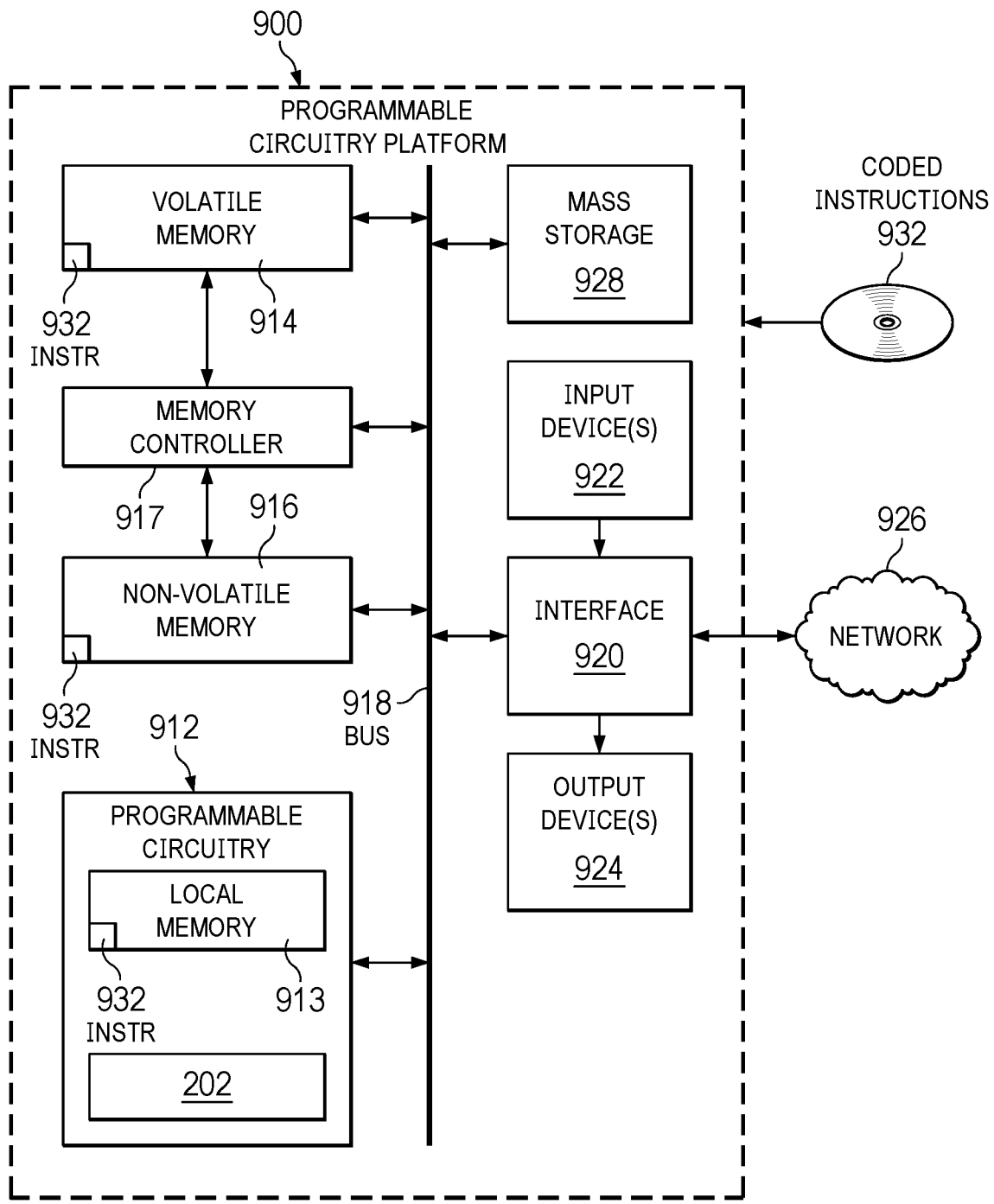
FIG. 9 is a block diagram of an example processing platform including programmable circuitry structured to execute, instantiate, and/or perform the example machine readable instructions and/or perform the example operations of FIGS. 6-8 to implement the controller circuitry of FIG. 2.

FIG. 9 is a block diagram of an example programmable circuitry platform 900 structured to execute and/or instantiate the example machine-readable instructions and/or the example operations of FIGS. 6-8 to implement the controller circuitry of FIG. 2. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the controller circuitry 202.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 6-8, may be stored in the mass storage device 928, in the volatile memory 914, in the non-volatile memory 916, and/or on at least one non-transitory computer readable storage medium such as a CD or DVD which may be removable.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

Numerical identifiers such as "first", "second", "third", etc. are used merely to distinguish between elements of substantially the same type in terms of structure and/or function. These identifiers used in the detailed description do not necessarily align with those used in the claims.

As used herein "substantially real time" refers to occurrence in a near instantaneous manner recognizing there may be real world delays for computing time, transmission, etc. Thus, unless otherwise specified, "substantially real time" refers to real time+1 second.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A. (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by. e.g., the same entity or object. Additionally, although individual features may be included in different examples or claims, these may possibly be combined, and the inclusion in different examples or claims does not imply that a combination of features is not feasible and/or advantageous.

Modifications are possible in the described embodiments, and other embodiments are possible, within the scope of the claims.

From the foregoing, it will be appreciated that example systems, apparatus, articles of manufacture, and methods have been described that improve transient response performance. Described systems, apparatus, articles of manufacture, and methods improve the efficiency of using a computing device by implementing the example ramp emulator circuitry 208 with the example control signals 232 to implement a feedback loop in which GCF is independent of $V_{in}$ and $V_{out}$. Accordingly, the example buck regulator circuitry 108 exhibits high GCF and fast transient response in a wide variety of use cases, including when $V_{in}$ is relatively high. Additionally, the example ramp emulator circuitry 208 includes a voltage source 318 and a switch 314, operated by the controller circuitry 202. Accordingly, current leakage from capacitors 308, 310 during DCM is counteracted and loss in transient response performance is avoided. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a first switch having a first terminal coupled to a switch terminal and a second terminal coupled to a current sense positive (CSP) terminal;
a second switch having a first terminal coupled to the CSP terminal;
a first resistor having a first terminal coupled to the second switch and a second terminal coupled to ground;
a first capacitor having a positive terminal coupled to the CSP terminal and a negative terminal coupled to ground;
a second resistor having a first terminal coupled to the CSP terminal and a second terminal coupled to a current sense negative (CSN) terminal;
a second capacitor having a positive terminal coupled to the CSN terminal and a negative terminal coupled to ground;
a third switch having a first terminal coupled to the CSP terminal; and a third resistor having a first terminal coupled to the third switch and a second terminal configured to receive a voltage source.

2. The apparatus of claim 1, wherein the switch terminal is coupled to:
a source of a high side field-effect transistor of a buck regulator circuit; and
a drain of a low side field-effect transistor of the buck regulator circuit.

3. The apparatus of claim 2, wherein:
the buck regulator circuit includes comparator circuitry;
the CSP terminal is coupled to a positive terminal of the comparator circuitry; and
the CSN terminal is coupled to a negative terminal of the comparator circuitry.

4. The apparatus of claim 2, wherein:
the buck regulator circuit is configured to receive an input voltage and produce an output voltage;
the buck regulator circuit includes a closed loop; and
a gain crossover frequency of the closed loop is independent of both the input voltage and the output voltage.

5. The apparatus of claim 1, further including controller circuitry configured to:
provide first control signals to cause the first switch to open and the second switch to close, wherein the first control signals further cause the voltage of the CSP terminal to increase to a fixed amplitude;
wait for a first amount of time;
provide second control signals to cause the first switch to close and the second switch to open; and
wait for a second amount of time, wherein the first control signals further cause the voltage of the CSP terminal to linearly decrease the voltage of the CSP terminal during the first amount of time and the second amount of time.

6. The apparatus of claim 5, wherein:
the first amount of time and the second amount of time form one duty cycle;
the resistance of the first resistor is based on a length of the duty cycle; and
the capacitance of the first capacitor is based on the length of the duty cycle.

7. The apparatus of claim 5, wherein:
the resistance of the first resistor is based on the fixed amplitude; and
the capacitance of the first capacitor is based on the fixed amplitude.

8. The apparatus of claim 1, further including controller circuitry configured to:
provide, in response to a determination to enter discontinuous conduction mode (DCM), first control signals to cause the first switch and the second switch to open; and
provide, in response to the determination to enter DCM, second control signals to cause the third switch to close, wherein the voltage source counteracts current leakage from the first capacitor and the second capacitor while the third switch is closed.

9. An apparatus comprising:
controller circuitry having an input and first and second outputs;
comparator circuitry having a positive input, a negative input, and an output, the output of the output of the comparator circuitry coupled to the input of the controller circuitry;
third circuitry coupled to the controller circuitry and the comparator circuitry, and including:

a resistor having first and second terminals, the first terminal coupled to a ground terminal;
a first switch having first and second terminals and a control terminal, the first terminal coupled to the second terminal of the resistor, the control terminal coupled to the first output of the controller circuitry;
a second switch having first and second terminals and a control terminal, the first terminal coupled to a switch terminal, the second terminal coupled to the second terminal of the first switch, the control terminal coupled to the second output of the controller circuitry;
a capacitor having first and second terminals, the first terminal coupled to the ground terminal, the second terminal coupled to the second terminals of the first and second switches and to the positive input of the comparator circuitry; and
a filter circuit coupled to the positive input and the negative input of the comparator circuitry.

10. The apparatus of claim 9, wherein the resistor is a first resistor, and the third circuitry further includes:
a second resistor having first and second terminals;
a third switch having first and second terminals and a control terminal, the first terminal coupled to the positive input of the comparator, the second terminal coupled to the first terminal of the second resistor, the control terminal coupled to a third output of the controller circuitry; and
a voltage source having a first and second terminals, the first terminal coupled to the second terminal of the second resistor, the second terminal coupled to the ground terminal.

11. The apparatus of claim 10, wherein the capacitor is a first capacitor, and the filter circuit includes:
a third resistor having first and second terminals, the first terminal coupled to the positive input of the comparator; and
a second capacitor having first and second terminals, the first terminal coupled to the ground terminal, the second terminal coupled to the second terminal of the third resistor and to the negative input of the comparator.

12. The apparatus of claim 10, wherein the controller is capable of opening the first and second switches and closing the third switch during a time period to charge the capacitor using the voltage source.

13. The apparatus of claim 9, wherein:
the resistor has a control terminal coupled to a third output of the controller circuitry; and
the capacitor has a control terminal coupled to a fourth output of the controller circuitry.

14. The apparatus of claim 9, wherein the controller circuitry is capable of:
closing the second switch and opening the first switch during a first time period to charge the capacitor; and
opening the second switch and closing the first switch during a second time period to discharge the capacitor.

15. A system comprising:
first transistor having first and second terminals and a gate, the first terminal coupled an input voltage terminal, the second terminal coupled to a switch terminal;
a second transistor having first and second terminals and a gate, the first terminal coupled to the switch terminal, the second terminal coupled to a ground terminal;
an inductor having first and second terminals, the first terminal coupled to the switch terminal, the second terminal coupled to an output voltage terminal;

controller circuitry having an input and first through fourth outputs, the third output coupled to the gate of the first transistor, the fourth output coupled to the gate of the second transistor;

comparator circuitry having a positive input, a negative input, a feedback input, a reference input, and an output, the feedback input coupled to the output voltage terminal, the output of the output of the comparator circuitry coupled to the input of the controller circuitry;

third circuitry coupled to the controller circuitry and the comparator circuitry, and including:
- a resistor having first and second terminals, the first terminal coupled to the ground terminal;
- a first switch having first and second terminals and a control terminal, the first terminal coupled to the second terminal of the resistor, the control terminal coupled to the first output of the controller circuitry;
- a second switch having first and second terminals and a control terminal, the first terminal coupled to the switch terminal, the second terminal coupled to the second terminal of the first switch, the control terminal coupled to the second output of the controller circuitry;
- a capacitor having first and second terminals, the first terminal coupled to the ground terminal, the second terminal coupled to the second terminals of the first and second switches and to the positive input of the comparator circuitry; and
- a resistor-capacitor filter circuit coupled to the positive input and the negative input of the comparator circuitry.

16. The system of claim 15, wherein the resistor is a first resistor, and the third circuitry further includes:
- a second resistor having first and second terminals;
- a third switch having first and second terminals and a control terminal, the first terminal coupled to the positive input of the comparator, the second terminal coupled to the first terminal of the second resistor, the control terminal coupled to a fifth output of the controller circuitry, and
- a voltage source having first and second terminals, the first terminal coupled to the second terminal of the second resistor, the second terminal coupled to the ground terminal.

17. The system of claim 16, wherein the controller is capable of opening the first and second switches and closing the second third switch during a time period in which the first and second transistors are both non-conducting.

18. The system of claim 16, wherein:
the first resistor has a control terminal coupled to a sixth output of the controller circuitry; and
the capacitor has a control terminal coupled to a seventh output of the controller circuitry.

19. The system of claim 18, wherein the controller circuitry is capable of:
closing a the second switch and opening the first switch during a first portion of a switching cycle of the first and second transistors to charge the capacitor to a first voltage level; and
opening the second switch and closing the first switch during a second portion of the switching cycle to discharge the capacitor.

20. The system of claim 19, wherein controller is capable of adjusting a resistance of the first resistor and adjusting a capacitance of the capacitor to set the first voltage level.

* * * * *